May 29, 1956 R. GOUIRAND 2,747,862
PNEUMATIC SUSPENSION DEVICES FOR VEHICLES
Filed May 4, 1955 2 Sheets-Sheet 1
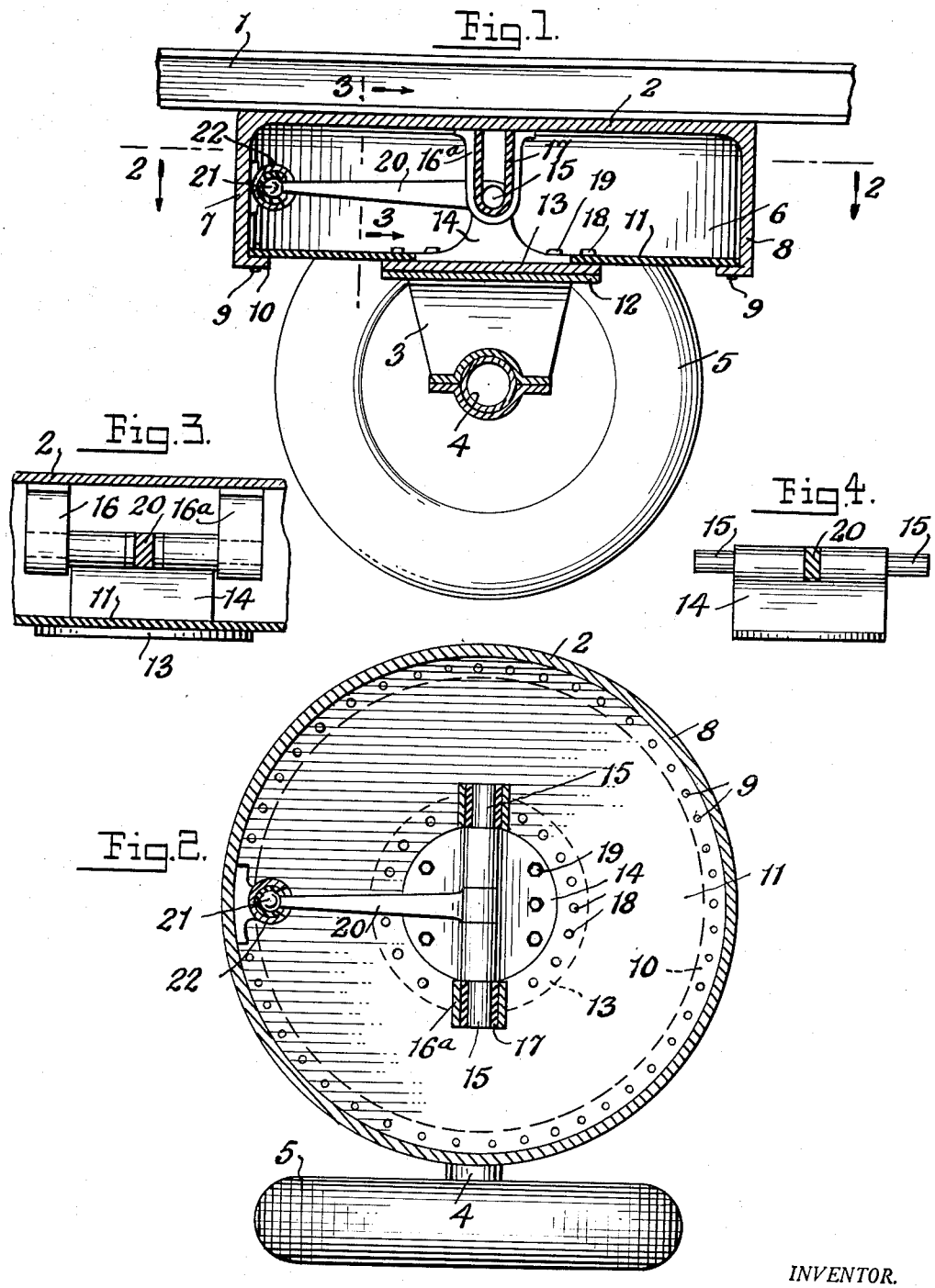
INVENTOR.
Rene Gouirand
BY Harry Radzinsky
Attorney May 29, 1956  R. GOUIRAND  2,747,862
PNEUMATIC SUSPENSION DEVICES FOR VEHICLES
Filed May 4, 1955  2 Sheets-Sheet 2
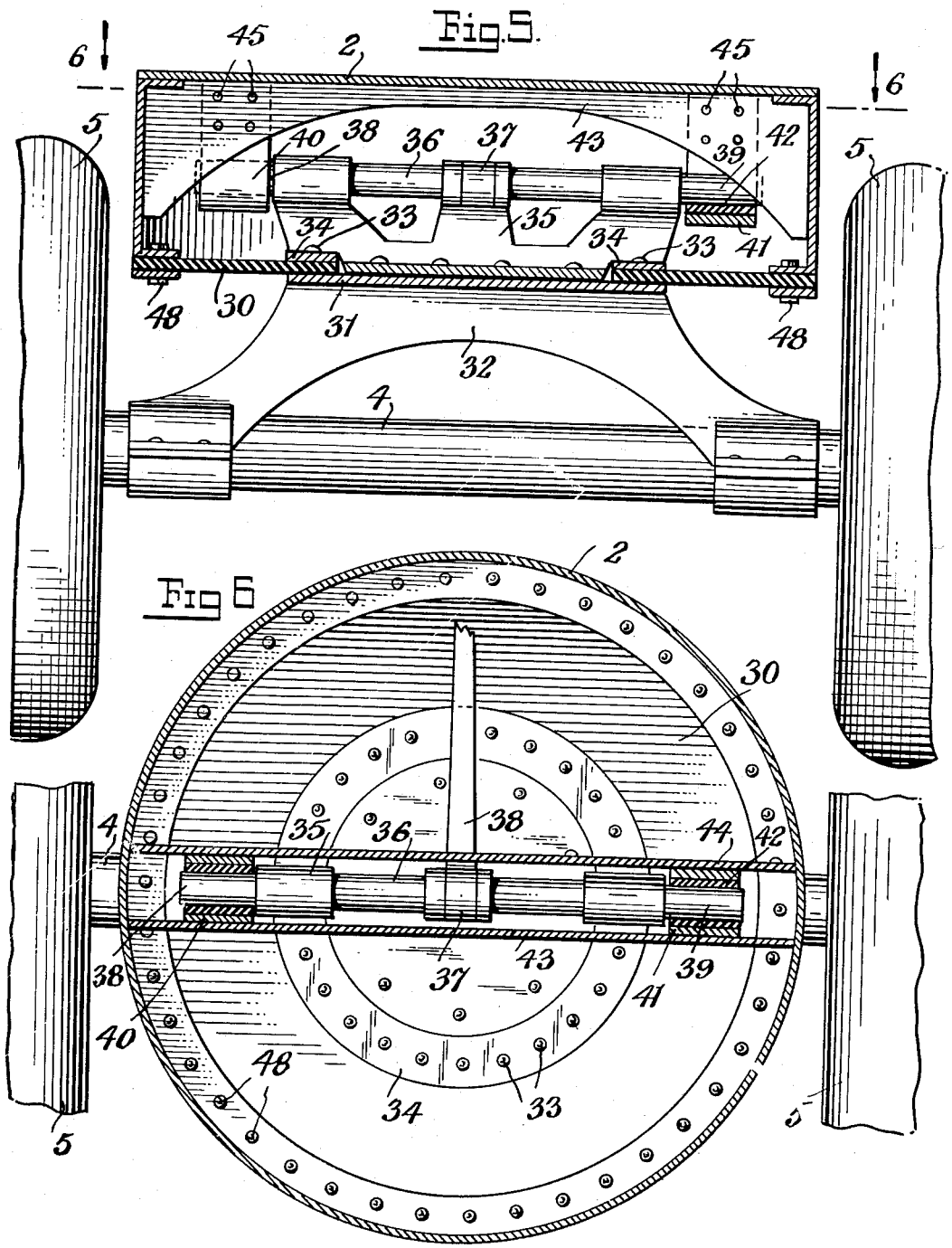
INVENTOR
Rene Gouirand
BY
Harry Radzinsky
ATTORNEY

United States Patent Office 2,747,862
Patented May 29, 1956

2,747,862

PNEUMATIC SUSPENSION DEVICES FOR VEHICLES

Rene Gouirand, New York, N. Y.

Application May 4, 1955, Serial No. 506,002

14 Claims. (Cl. 267—65)

This invention relates to pneumatic suspensions for vehicles, such as automobiles, trailers, trucks, railway cars, and other wheeled conveyances.

It is an object of the invention to provide a simple and economical pneumatic suspension adapted to support both light and heavy loads with equal facility, and to provide means for effectively controlling the side sway of the vehicle and assuring smooth and easy riding despite the transportation of heavy loads.

It is an object of the invention to provide means for preventing dipping or forward movement of the body of the vehicle relatively to the chassis, particularly on application of the brakes, with said means being wholly enclosed within a pneumatic chamber.

It is a further object of the invention to provide a minimum of resilient support for heavy loads while preventing sagging of the vehicle and side sway which is often incidental to unequal loading.

With these objects, and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a vertical sectional view through a pneumatic suspension apparatus constructed in accordance with the invention;

Fig. 2 is a sectional view, taken substantially on the line 2—2 of Fig. 1, looking in the direction of the arrows;

Fig. 3 is a sectional view, taken substantially on the line 3—3 of Fig. 1, looking in the direction of the arrows;

Fig. 4 is a view of the bracket;

Fig. 5 is a vertical sectional view of another embodiment of the invention, and

Fig. 6 is a sectional view on the line 6—6 of Fig. 5, looking in the direction of the arrows.

Referring to the drawing, 1 indicates one of the longitudinal frame members of the chassis frame of conventional construction. There are usually two of these frame members only one appearing in the drawing. The body of the vehicle, which might be a trailer, truck, car or vehicle of other form, is supported on at least two of these frame elements in the known manner.

Secured to the frame members 1 by any suitable means, is a pneumatic chamber or air tank 2, which in the form shown is substantially of circular or cylindrical shape, and is provided with the air-containing chamber 6 defined by the annular side wall 8. At its lower end, the side wall 8 of the pneumatic chamber is provided with an inturned annular flange 10, to which is secured, as by the bolts 9, the outer marginal edge of an annular diaphragm 11. This diaphragm 11 is preferably composed of flexible elastic material, such as for example, vulcanized rubber in which is embedded cord or fabric reinforcements to impart the necessary strength to the diaphragm. At its inner edge the diaphragm is attached to the marginal outer edge portion of a metal disk 13. Bolts 18 or equivalent fastening means, are employed for attaching the diaphragm 11 to the disk 13. Through the arrangement disclosed, it will be apparent that the chamber 6 is hermetically sealed and will retain air under pressure, provided within it to meet the requirements of the loads imposed on the vehicle. Known means, such as shown in prior patents obtained by me, may be employed for regulating the air pressure in the chamber and permitting of its displacement and return to the chamber when inequalities in the road are encountered by the vehicle.

The central metal disk 13, which is of strong and rugged construction, may be secured to or form part of a cradle 3 attached to the axle 4 of the vehicle, and on which the wheels 5 are carried in the conventional manner. If the vehicle is motor driven, the axle 4 may be provided with the usual differential mechanism in the known manner.

To restrain side sway and to maintain the disk 13 central, and particularly when braking action is applied, a connecting rod or arm 20 is provided, and the same is contained within the chamber 2 and it extends radially from the center of the disk 13 to the outer wall 8 of the pneumatic chamber 2. One end of the connecting rod 20 is pivotally mounted on a bracket 14 which is positioned at the center of the disk 13 and extends transversely of the same, and is also completely contained within the air chamber 2. Said bracket is attached to the disk 13 by means of the bolts 19, or it might be formed as an integral part of the disk 13. At its opposite end, the connecting rod 20 is pivotally attached to the wall 8 of the pneumatic chamber by means of a ball-and-socket connection, the ball 21 thereof being formed or otherwise provided at the end of the connecting rod, and the socket 22 therefor being rubber-lined and being suitably firmly attached to the inside face of the wall 8 of the chamber 2.

As will be noted in Figs. 2 and 4, the bracket 14 is formed with lateral extensions 15 which are extended through loop members or guides 16 and 16a secured to the top wall of the pneumatic chamber and extending downwardly within said chamber 2. These loop members 16 and 16a are rubber-lined as indicated at 17, and are so shaped as to permit vertical or up and down movement of the ends 15 of the bracket within them when the disk 13 is moved upwardly under road shocks.

From the foregoing, the operation of the described structure will be readily understood. As the vehicle passes over obstructions in the roadway, the disk 13 will rise and then descend, while the rising movement is opposed by the air pressure in the chamber 2. As the disk rises and descends, it will always be maintained centrally of the chamber 2, by the rod 20, and since any twisting movement of the disk will be thus restrained, side sway of the vehicle will be strongly resisted. It also follows that when a braking force is applied, the tendency of the disk to become de-centralized, with a resultant dipping action of the vehicle, will be strongly opposed. As a result, a vehicle equipped with the described structure will ride smoothly with a minimum of sway and inclination.

In herein describing the disclosed embodiment of the invention, it has been suggested that the connecting rod 20 shall have one end pivotally mounted on the bracket 14. As an alternative for this, said end of the rod might be formed as an integral or fixed part of the bracket and be immovable relatively thereto. In such case, the connecting rod will be pivotally mounted at one end only, namely at the end which is connected to the wall of the pneumatic chamber. The construction of the described device is such that the rod 20 and the elements 14, 15, 16, 16a, 21 and 22 associated with it are all contained within and concealed by the pneumatic chamber 2. They are thus protected from possible damage and from deterioration.

In the embodiment of the invention shown in Figs. 5 and 6, the pneumatic chamber 2 has its lower wall composed of an annular diaphragm 30 secured at its inner edge to the metal disk 31 and secured at its other edge by bolts 48 to the flange 49 at the lower end of the chamber 2. A yoke 32 is attached to the disk and it supports the axle 4 on which the wheels 5 are mounted. The inner edge of the diaphragm 30, which is flexible as described in connection with the diaphragm 11, is securely attached to the disk 31 by fastening elements, such as bolts 33, extending through the reinforcing ring 34. Fastened to the disk 31 is a bracket 35 in which a shaft 36 is mounted. Centrally mounted on the shaft 36 is one end of the arm or connecting-rod 38, which has its opposite end secured to the wall of the chamber 2 by a ball-and-socket connection not shown in Figs. 5 and 6 but as described in connection with the structure of Figs. 1 and 2.

The shaft 36 has extending end portions 38 and 39 projecting beyond the bracket 35 and said end portions 38 and 39 are respectively received in the loop members 40 and 41. Said loop members are rubber-lined, as indicated at 42. The loop members 40 and 41 can be supported, similarly to those shown in Figs. 1 and 2, namely from the top wall of the chamber 2, or they can be fastened as shown at 45 in Figs. 5 and 6, to spaced-apart cross-braces 43 and 44 which extend transversely across the chamber from diametrically-opposite points on the side wall. Thus, these cross braces not only support the loop members 40 and 41, but strongly reinforce the pneumatic chamber 2.

It will be noted that the loop members 40 and 41 are so positioned that they are located directly over the flexible diaphragm, rather than over any part of the disk 31. Thus, should an unusually large obstruction be encountered in the road and over which the vehicle would ride, the diaphragm rising upwardly, would contact with the lower ends of the loop members rather than the disk 31.

Having described several embodiments of the invention, it is obvious that the same is not to be restricted thereto, but is broad enough to cover all structures coming within the scope of the annexed claims.

What I claim is:

1. In a vehicle, a pneumatic chamber having a bottom wall composed of a central disk surrounded by an annular flexible diaphragm, means for attaching an axle to the disk, a connecting rod located within the chamber and having one end pivotally attached to a wall thereof, a bracket secured to the disk and located within the chamber, the second end of the connecting rod being attached to said bracket.

2. In a vehicle, a pneumatic chamber having a bottom wall and a side wall, the bottom wall consisting of a central disk surrounded by a flexible diaphragm, the diaphragm having its outer marginal edge attached to the side wall of the chamber, a bracket secured to the top of the disk within the chamber, a connecting rod attached to the bracket and projecting radially from the center of the disk, said rod having an outer end pivotally attached to the side wall of the disk within the chamber.

3. In a vehicle, a chassis frame, a pneumatic chamber carried by the frame, a wheeled carriage located below the chamber, said carriage having a disk constituting a central part of the lower wall of the pneumatic chamber, an annular flexible diaphragm having its outer marginal edge attached to the side wall of the pneumatic chamber and its inner marginal edge attached to the outer edge of the disk, a connecting rod located within the chamber, said connecting rod having one end pivotally attached to a wall of the chamber and its other end attached to the disk.

4. In a vehicle construction as provided for in claim 3, wherein the end of the rod which is attached to the wall of the chamber is attached thereto by a ball-and-socket connection and the other end of the rod is pivotally attached to a bracket mounted on the disk.

5. In a vehicle, a pneumatic chamber having a bottom wall composed of a central disk surrounded by an annular flexible diaphragm, means for attaching an axle to the disk, a connecting rod located within the chamber and having one end pivotally attached to a part of the chamber on the interior thereof, and its other end attached to the disk on the interior of the chamber.

6. In a vehicle, a pneumatic chamber having a bottom wall composed of a central disk surrounded by an annular flexible diaphragm, means for attaching an axle to the disk, a bracket secured to the disk within the chamber, a connecting rod having one end pivotally attached to the bracket and having its other end pivotally attached to a part of the chamber, and guide means in which ends of the bracket are vertically guided during raising and lowering of the disk.

7. In a vehicle, a pneumatic tank having a bottom wall composed of a central disk surrounded by a flexible annular diaphragm, the outer edge of the diaphragm being attached at the peripheral edge of the tank, the inner edge of the diaphragm being attached at the periphery of the disk, a connecting rod having one end pivoted at the center of the disk and its other end pivoted at the edge of the tank, the connecting rod and the connections at both of its ends being enclosed within and concealed by the tank.

8. In a vehicle, a pneumatic tank having a bottom wall comprising a disk surrounded by an annular flexible diaphragm, the outer edge portion of the diaphragm being attached to the side wall of the tank, a bracket attached to the upper face of the disk and located within the tank, guide members secured at the top of the tank and dependent downwardly therefrom within the tank, the bracket having its ends positioned in the guide and capable of vertical movements therein, a connecting rod having one end attached to the bracket and its other end pivotally attached to the side wall of the tank, the bracket, connecting rod and guide members all being contained within the tank.

9. In a vehicle, a pneumatic chamber having a bottom wall comprising a central disk surrounded by an annular flexible diaphragm, the outer marginal edge of the diaphragm being attached to the side wall of the chamber, a bracket in the pneumatic chamber and attached to the central disk, said bracket having an arm extending radially from the center of the disk and having its outer end pivotally attached to the wall of the pneumatic chamber, the arm being wholly contained within the pneumatic chamber.

10. In a vehicle, a pneumatic chamber having a bottom wall composed of a central disk surrounded by an annular flexible diaphragm, means for attaching an axle to the disk, a bracket secured to the disk within the chamber, a shaft extended through the bracket, an arm having one end secured to the shaft and its other end pivotally attached to the chamber, said shaft having end portions extending beyond the bracket and positioned over the diaphragm, and guides for said ends, said guides being also located above the diaphragm.

11. In a vehicle as provided for in claim 10, wherein the chamber is provided with transverse brace members, and the guides are in the form of loops and are located between and are attached to the braces.

12. In a vehicle, a pneumatic chamber having a bottom wall composed of a central disk surrounded by an annular flexible diaphragm, means for attaching an axle to the disk, a bracket attached to the disk and located within the chamber, an arm attached at one end to the bracket, the arm having a second end pivotally attached to the chamber at a point remote from the bracket, the bracket having end portions extending from it and positioned above the diaphragm, and suspension loops extending downwardly from the top of the chamber and located above the diaphragm and in which the projecting ends of the bracket are movably positioned.

13. In a vehicle as provided for in claim 12, wherein the suspension loops are fastened between a pair of cross members extending through the chamber, said loops being rubber-lined.

14. In a vehicle, a pneumatic chamber having a bottom wall composed of a central disk surrounded by an annular, flexible diaphragm, means for attaching an axle to the disk, a bracket secured to the disk within the chamber, an arm having one end attached to the bracket and another end attached to the chamber remote from the bracket, the bracket having end portions located above the disk, and loops extending downwardly from the upper portion of the chamber and movably receiving the extended parts of the bracket within them.

References Cited in the file of this patent

UNITED STATES PATENTS

| | | |
|---|---|---|
| 971,583 | Bell | Oct. 4, 1910 |
| 1,445,970 | O'Connor | Feb. 20, 1923 |
| 2,567,151 | Hornbostel | Sept. 4, 1951 |
| 2,694,569 | Gouirand | Dec. 4, 1952 |